INVENTOR
R.H. WININGS
BY J. F. Landis
ATTORNEY

United States Patent Office 3,424,628

Patented Jan. 28, 1969

3,424,628
METHODS AND APPARATUS FOR TREATING SEMI-CONDUCTIVE MATERIALS WITH GASES

Richard H. Winings, Fleetwood, Pa., assignor to Western Electric Company, Incorporated, New York, N.Y., a corporation of New York Filed Jan. 24, 1966, Ser. No. 522,506
U.S. Cl. 148—175 17 Claims
Int. Cl. H01l 7/36

This invention relates to the manufacture of semiconductors, and more particularly to improved methods and apparatus for treating semiconductive materials with gases at elevated temperatures.

As a first step in the manufacture of semiconductors, it is conventional to grow a large crystal from various semiconductive materials. Ordinarily, these semiconductive materials are selected from Group IV elements such as silicon or germanium, or from compound Group III and V elements. In accordance with one well known manufacturing method, the melt from which the crystal is grown is doped with a conductivity type determining impurity (e.g., a Group III or V element) so that the entire crystal will either by a p- or n-type semiconductor. The resulting p- or n-type crystal is subdivided into a series of thin, polished discs, referred to as "slices," and the slices are then treated with additional conductivity type determining impurities to establish one or more p-n junctions therein. After the desired number and type of p-n junctions have been established in a slice, the slice is, in turn, subdivided into many hundreds of small individual wafers. Finally, the manufacture of semiconductors is completed by suitably mounting one of these wafers and connecting it to appropriate electrical leads.

The above outlined techniques for preparing semiconductors are advantages in that a comparatively large slice may be treated with the desired impurities with greater facility than can a myriad of small individual wafers. Further, if the slice is uniformly doped with these impurities, all of the wafers prepared from a single slice will have substantially identical physical and electrical properties and the semiconductors manufactured therefrom will have matched electrical properties. To achieve this desirable result, it is necessary to provide methods and apparatus for the treatmemnt of slices that will insure that the conductivity type determining impurities will be uniformly diffused into the slice. It should be understood that as used herein, a "uniform diffusion" of an impurity into a slice refers to that condition which exists when the impurity is diffused to a uniform depth below the surface or face of the slice. Stated somewhat differently, a "uniform diffusion" may be said to exist if the amount of impurity present at any given point within the slice is substantially the same as the amount of impurity present at all other points within the slice that lie on a plane taken through the given point parallel to the surface of the slice.

While many factors will influence the degree of uniformity with which a conductivity type determining impurity will be diffused into a slice, this invention is concerned only with those factors as they relate directly to the treatment of a slice with a gaseous material at elevated temperatures (i.e., above about 500° C.). These high temperature gaseous treatments of wafers find great utility during several different steps in the manufacture of a semiconductor and include, inter alia, the gaseous diffusion of a conductivity type determining impurity into a slice, the oxidation of, or deposition of an oxide layer over, the surface of a slice, or the growth of an epitaxial layer onto the surface of a slice.

While the invention is not so limited, it is useful for purposes of description to refer to those methods for the manufacture of semiconductors wherein the selective diffusion of a conductivity type determining impurity into a slice is controlled by means of an oxide mask. These methods are particularly illustrative since they may utilize several different types of the above named high temperature gaseous treatments with which this invention is concerned. In these processes utilizing an oxide mask, the surface of the slice (which may be comprised of a previously grown epitaxial layer) is first covered with an oxide layer by oxidation of, or by deposition of an oxide layer over, the surface of the slice. A selected portion of the oxide mask is removed from the surface of the slice and the surface is treated by exposure to various gases having conductivity type determining impurities. The oxide layer, depending upon its thickness and the type of impurity used, inhibits diffusion into the slice. The impurity diffusion is thus limited to the unmasked areas, and a slice is produced having a plurality of conductive type regions differing from the original material. By the use of successive masking and diffusing steps, a diffused structure having complex arrangements of differing conductivity type regions is formed.

Typically, the oxide mask patterns are formed by the conventional photolithographic and etching processes. In these processes, the oxidized surface of the slice is coated with a photosensitive material to form a resist and the latter is exposed to light through an apertured mask or stencil. The portions of the resist that are exposed to the light are insoluble in developing fluid and remain as a film on the oxide layer while the portions of the resist that were protected from the light are dissolved by the fluid, thus leaving a plurality of apertures or "windows" in the resist. As these apertures expose small areas in the oxide layer, a corrosive fluid such as hydrofluoric acid, which will attack the oxide layer but not the slice itself, may be applied to the photoresist and to the exposed areas of the oxide layer to etch a pattern of tiny apertures in the oxide layer. In subsequent fabrication operations, as noted above, impurity materials may be diffused through these apertures in the oxide mask into the semiconductor slice to create a pattern of p-n junctions, or metallic contacts may be evaporated or the exposed portions of the semiconductor wafer to form terminals thereon. (A more complete description of these processes may be found in U.S. Letters Patent 2,802,760; 3,144,366; and 3,156,593.)

In order to obtain a uniform growth or deposit of a layer over the surface of the slice and/or a uniform diffusion of an impurity into the slice when utilizing the above high temperature gaseous treatment methods, it is essential first, that the slice be uniformly contacted with the gaseous treatment material, and second, that a substantially uniform temperature be maintained over the entire surface of the slice during treatment. In this latter regard, it should be understood that the growth or deposition of a layer over the surface of the slice and/or the diffusion of an impurity into the slice are quite sensitive to variations in process temperature. The problem of maintaining a uniform temperature is particularly troublesome due to the extremely high temperatures that are commonly used in conducting these processes. For example, required treatment temperatures may range from about 500° C. to about 1500° C., at which temperatures it may be desired to hold the maximum variation in temperature across the slice to as little as about ±1° C. Until now, no methods or apparatus have been available for the gaseous treatment of slices that would provide this degree of temperature regularity at these elevated temperatures, and accordingly, it has not been possible to obtain the diffusion of conductivity type determining impurities into slices or the deposition of material thereon with the degree of uniformity desired.

Accordingly, it is an object of this invention to provide improved methods and apparatus for treating semiconductive materials with gaseous materials at elevated temperatures.

Another object of this invention is to prepare slices of semiconductive materials that have conductivity type determining impurities uniformly diffused therein.

Yet another object of this invention is to provide improved methods and apparatus whereby a uniform temperature may be established and maintained over the entire surface area of a semiconductive material while the material is being treated with gases.

Still another object of this invention is to provide improved methods and apparatus for uniformly contacting the surface of semiconductive material with gases during high temperature diffusion or deposition processes.

Another object of this invention is to provide improved methods and apparatus for the gaseous treatment of semiconductive material whereby a uniform deposition or epitaxial growth of material over the surface of such material can be obtained.

Still another object of this invention is to provide methods and apparatus for manufacturing a plurality of semiconductive elements having substantially identical physical and electrical properties.

Briefly, these and other objects of this invention are achieved by contacting a body of semiconductive material with treatment gases; maintaining the body at a desired treatment temperature by positioning it in heat transfer relationship to a susceptor plate; heating the plate, preferably by energy emitted from a proximately positioned radio frequency coil; rotating the susceptor plate; and rotating the semiconductive body relative to the surface of the plate. By these means, an epicyclic motion is imparted to the body that enables the establishment of a substantially uniform temperature across the entire body and insures that the surface of the body will be uniformly contacted by the treatment gases.

Other objects, advantages and features of the invention will be apparent from the following detailed description of specific embodiments and examples thereof, when read in connection with the accompanying drawings, in which.

APPARATUS

Figure 1:
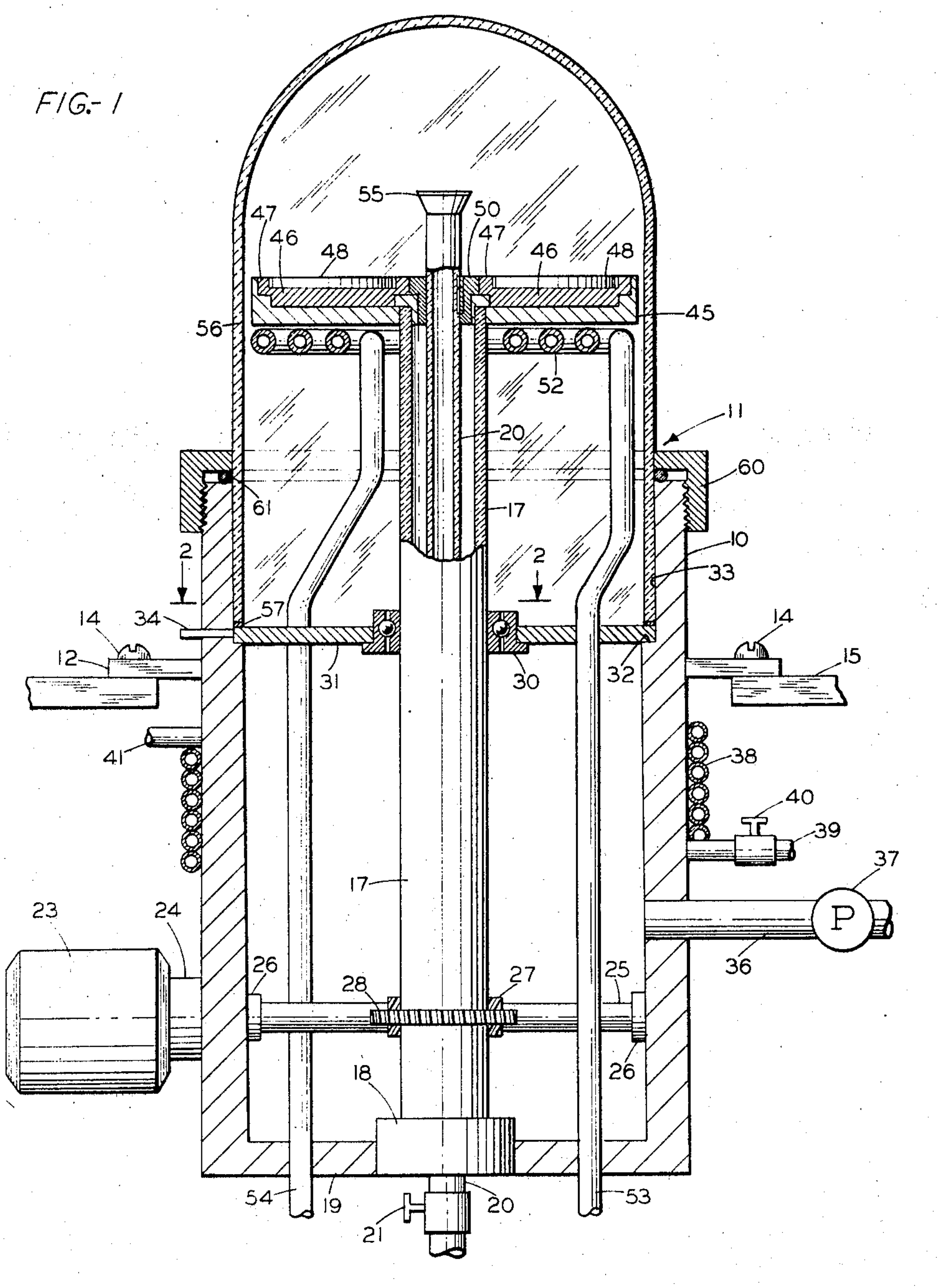
FIG. 1 is a somewhat schematic view, partially in section, of apparatus illustrating one specific embodiment of this invention.
Figure 2:
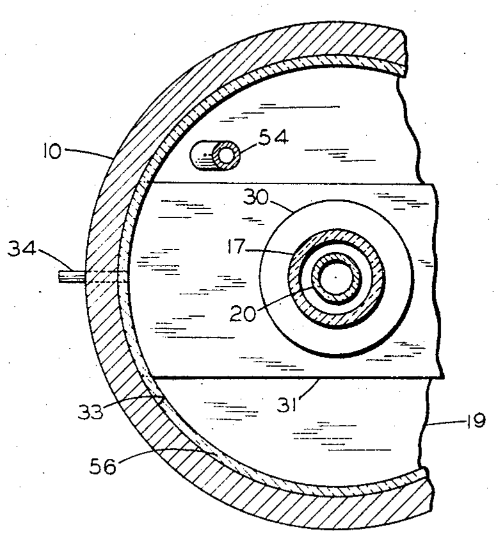
FIG. 2 is a fragmentary horizontal cross sectional view taken along line 2—2 of FIG. 1.
Figure 3:
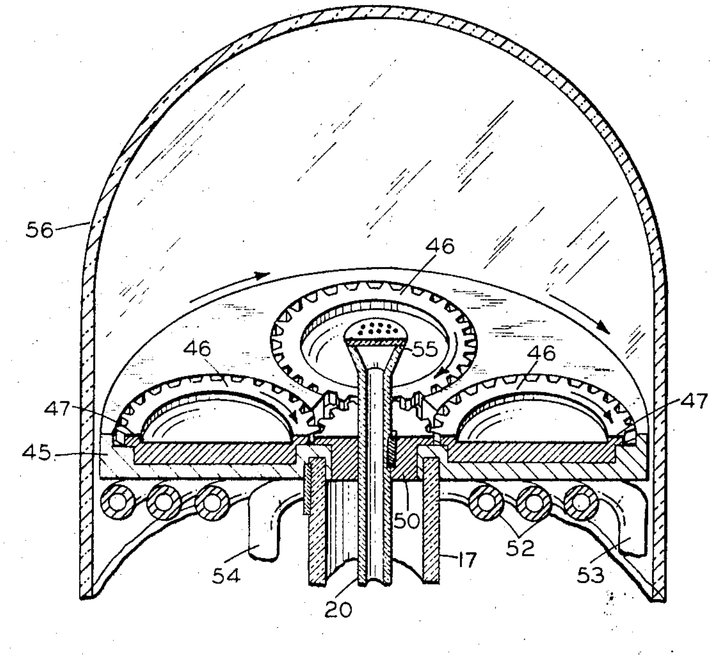
FIG. 3 is a somewhat schematic perspective view, partially in section, showing certain details of the upper portion of the apparatus illustrated in FIG. 1.

A preferred apparatus for practicing the invention is illustrated in FIGS. 1 through 3. This apparatus includes a lower chamber 10 having an open end indicated generally at 11 and is provided with a flange 12 for mounting on studs 14—14 in an aperture of a support such as a bench 15. A tubular supporting shaft 17 extends vertically through the lower chamber 10 from a unit 18 mounted in the bottom wall 19 of the chamber which is adapted to support the shaft 17 for rotation. The tubular shaft 17 contains within it a coaxially mounted gas conduit 20. The unit 18 seals the space between the inside of the shaft 17 and the outside of the gas conduit 20. The gas conduit 20 is provided with a valve 21 to enable control of the flow of gas through the conduit 20.

The shaft 17 can be rotated at a speed controlled by a motor 23 and a magnetic drive unit 24 mounted on the outer wall of the chamber 10 and having an output shaft 25 journalled in sealed bearings 26—26. A worm 27 is mounted on the shaft 25 to engage a worm gear 28 mounted on the shaft 17 in order to complete the driving means. The shaft 17 is rotatably mounted in a bearing 30, which is supported inside the lower chamber 10 by a rectangular spacer 31 having ends adapted to rest on a shoulder 32 of an annular recess 33 provided adjacent the open end 11 of the lower chamber 10. One end of the spacer 31 is notched to receive a pin 34 that will secure the spacer against rotation.

An outlet 36 is provided in the lower chamber 10 and is connected to a suction line by means of a vacuum pump 37. As it is desirable to be able to cool the lower portion of the chamber 10, a cooling coil 38 is provided that may be supplied with a liquid coolant by means of a supply line 39. The flow of a coolant liquid is controlled by a valve 40 and the coolant is discharged from the cooling coil 38 through an outlet line 41.

At the upper end of the tubular shaft 17 there is mounted a susceptor plate 45, which is keyed to the shaft 17 so that rotation of the shaft 17 causes the plate 45 to rotate. The susceptor plate 45 is recessed to receive a plurality of work holders 46—46, each of which is provided with a flanged portion 47 adapted to receive and support a semiconductor slice 48 on each work holder 46. The flanged portions 47—47 maintain the slices 48—48 properly positioned on the work holders 46—46. Also, the outer peripheries of the flanged portions 47—47 are provided with gear teeth that engage mating gear teeth provided on the outer periphery of a fixed gear 50. The gear 50 is keyed to the conduit 20 and, as the conduit 20 is fixedly positioned and cannot rotate the gear 50 will not rotate.

A ratio frequency coil 52 is disposed subjacent the susceptor plate 45. Preferably, the coil 52 is disposed on a horizontal plane with its axis passing approximately through the central axis of the susceptor plate 45. The coil 52 is provided with a lead-in conductor 53 that extends upward through and beyond the chamber 10 and a lead-out conductor 54 that extends downward through the chamber 10. Both of these conductors 53 and 54 extend through the bottom portion 19 of the lower chamber.

At the upper end of the conduit 20, there is provided a porous or perforated gaseous dispersion baffle 55.

The apparatus is enclosed at its upper end by a bell jar 56, preferably made of quartz, that rests on an annular gasket member 57 to form a seal with the spacer 31. A retaining ring or cap 60 is engaged by means of screw threads at the upper end of the chamber 10 and is provided with a sealing ring 61 which may be compressed to seal the upper chamber in the open end of the lower chamber 10.

The materials from which some of the above described components are fabricated may be of considerable importance. For example, it is generally desirable to fabricate the shaft 17, the conduit 20, and the bell jar 56 of quartz. This is due to the fact that quartz will withstand the treatment temperatures within the apparatus, the treatment gases will not attack or diffuse into the quartz, and the quartz will not release contaminating materials into the system.

The susceptor plate 45 must be constructed of a material that is susceptible to heating by radio frequency energy. (The term "susceptor plate" has been chosen for use herein to indicate that the plate is susceptible to heating by radio frequency energy.) Also, to avoid contaminating material from entering the system, the susceptor should be chemically inert to the treatment gases and have a very low vapor pressure at treatment temperatures. It has been found that molybdenum best meets these criteria, and accordingly, it is the preferred material for making the susceptor plate.

The work holders 46—46 and the stationary gear 50 should also be comprised of materials that have a low vapor pressure and will be inert to the treatment gases. Additionally, in order to minimize friction and to provide for smooth operation, it is desirable to fabricate the work holders 46—46 and the stationary gear 50 from a material that has a low coefficient of friction. While carbon or graphite meet these criteria, it has been discovered that the presence of pure carbon or graphite within the treatment chamber may cause unsatisfactory results to be obtained. For reasons that are not entirely clear, it has been observed that when carbon or graphite is so present, a p-type layer will tend to be formed on the surface of the slice regardless of other conditions. Accordingly, this layer is sometimes referred to as a "phantom p layer."

It has been discovered that this phantom p layer may be avoided if the carbon work holders and the stationary gear are made from a silicon carbide coated graphite, which is available in commerce. Alternatively, good results can be obtained if the work holders and the gear are made from carbon or graphite and then exposed to an atmosphere of silicon tetrachloride and hydrogen gases at high temperatures. This causes a silicon layer to deposit on the carbonaceous material which, when raised to above the melting point of the silicon (about 1500° C.), will cause the silicon to wet the carbon surface and apparently be dissolved therein. It is believed that by this treatment, some form of silicon carbide protective layer is formed over these parts, which in turn will prevent the formation of a phantom p layer over the slices.

OPERATION OF APPARATUS

In operation, the semiconductive slices 48—48 are placed in the recesses of the work holders 46—46 that are mounted on the susceptor plate 45 and the bell jar 56 is secured in the recess of the lower chamber 10 and sealed in place. The interior is then exhausted of air through operation of the pump 37 and is purged with an inert gas such as helium which is introduced by way of the conduit 20. At the same time, the motor 23 is energized, causing the susceptor plate 45, which is keyed to the tubular shaft 17, to rotate. Further, since the gear 50 is stationary and it engages the gear teeth on the flanges 47—47 of the work holders 46—46, epicyclic motion is imparted to the semiconductor slices 48—48; that is, they rotate about their own axes and simultaneously revolve about the axis of the susceptor plate 45.

The radio frequency coil 52 is energized to heat the molybdenum susceptor plate 45, and, in turn, the work holders 46—46 and the slices 48—48 mounted thereon will become heated to a steady temperature. This steady temperature is reached when the energy input from the radio frequency coil and the heat losses from the system reach a balance.

Due to the aforementioned epicyclic motion of the slices 48—48, a uniform temperature across the slices is insured. As can readily be understood, the work holders 46—46 and the slices 48—48 are constantly changing position with respect to the susceptor plate 45, and the susceptor plate 45 in turn is constantly changing position with respect to the radio frequency coil 52. By this means, any small variation in the effect of the coil upon the susceptor plate 45 will be averaged out over the rotating susceptor plate 45, and any small variation in the temperature of the susceptor plate 45 will be averaged out over the rotating slices 48—48.

Once a steady and uniform temperature is established, an appropriate treatment gas is introduced into the chamber by means of the valve 21, the conduit 20, and the gas dispersion baffle 55. It will be noted that the epicyclic motion of the slices 48—48 not only insures the establishment of a uniform temperature in the slices 48—48, but also insures uniform contact of the treatment gases with the slices.

METHODS OF TREATMENT

As has previously been discussed, the method and apparatus of the invention are useful in performing several different types of high temperature gaseous treatments of semiconductive materials. In order to illustrate this fact, it is thought useful to refer to the manufacture of a particular semiconductive device in which several different types of these gaseous treatments are used. To this end, progressive steps in the production of an epitaxial n-p-n planar transistor are schematically shown in FIGS. 4A through 4H and are described below, particularly as they relate to this invention, the vertical dimensions being exaggerated for clarity.

Figure 4A:
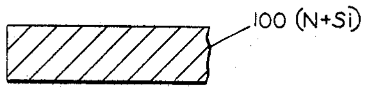
FIGS. 4A through 4H are fragmentary schematic views illustrating a typical semiconductive device in various stages of its manufacture.

Referring to FIG. 4A, a first step in the manufacture of an epitaxial planar semiconductor is the preparation of a semiconductive slice 100. This slice represents a slice taken from a large single crystal that was heavily doped to provide a low resistivity. As indicated in the drawing, this material is shown as being n+, indicating that there is a relatively high concentration of donor atoms existing in the slice. While it is not material to this invention, the slice will be described as being comprised of silicon, though germanium, silicon carbide, mixtures of Groups III and V elements, or other semiconductive materials could be used.

After the slice 100 has been cut and polished, it is mounted on one of the carbon work holders 46, the susceptor plate 45 is rotated, the chamber is purged of atmospheric gases, and the radio frequency coil 52 is energized. The input to the radio frequency coil is adjusted to bring the susceptor plate to a steady temperature of about 1200° C. After this condition has been realized, a gas comprised of silicon tetrachloride and hydrogen is introduced into the upper chamber through conduit 20 and dispersion baffle 55. Under these conditions, an epitaxial growth of silicon 102 will take place over the exposed surface of the slice. During the epitaxial growth of the silicon layer, a certain amount of the n-type impurity will migrate from the heavily doped slice 100 into the epitaxial layer 102. Accordingly, this epitaxial layer 102 will be an n-type material, unless, of course, the treatment gases are intentionally doped to another conductivity or level.

It should again by emphasized that during the growth of the epitaxial layer, any given point on the slice is constantly changing its position with respect to the susceptor plate 45, while in turn the susceptor plate 45 is constantly rotating with respect to the radio frequency coil 52. By these means, a uniform temperature is obtained over the entire exposed surface of the slice and the growth of a uniform epitaxial layer is assured.

Figure 4B:
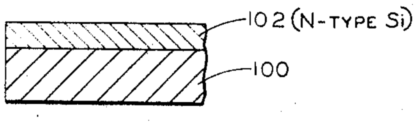
Figure 4C:
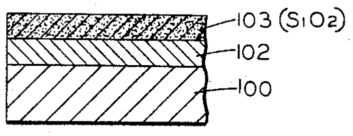

After the epitaxial layer 102 has been grown, as is shown in FIG. 4B, the slice is treated to form an oxide layer 103 over the epitaxial layer 102 as illustrated in FIG. 4C. This oxide layer can be obtained either by oxidizing the surface of the epitaxial layer 102 or by depositing or growing an oxide layer over the surface of the epitaxial layer 102. In either instance, however, both the method and apparatus of the instant invention may be utilized. For example, if the surface of the epitaxial layer 102 is to be oxidized, a gas comprised of hydrogen and water vapor is introduced into the apparatus of this invention while the slice is maintained at high temperatures. In a similar manner, if it is desired to deposit a layer of silicon dioxide, a gas comprised of carbon dioxide, silicon tetrachloride and hydrogen will be used.

Figure 4D:
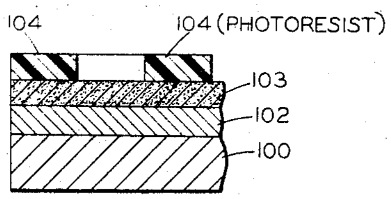

After the oxide layer 103 has been formed over the epitaxial layer 102, the oxide layer 103 is coated with a photoresist material 104. A mask of suitable pattern is placed over the photoresist layer 104 and the slice is subjected to ultraviolet light to crosslink the exposed portions of the photoresist material and cause it to become insoluble. The mask is then removed and the photoresist is exposed to a solvent which will selectively dissolve the uncrosslinked or unexposed portions of the photoresist material. FIG. 4D illustrates a slice after the photoresist material has been masked, treated with light, and selectively dissolved.

Figure 4E:
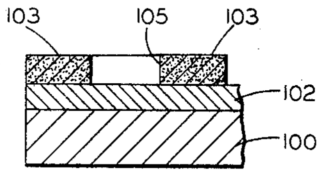
Figure 4F:
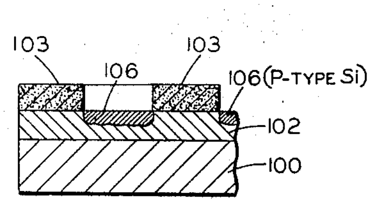

In the next step for the preparation of a planar epitaxial transistor, the oxide layer 103 of the slice is exposed to an acid etching material such as hydrogen fluoride. As the hydrogen fluoride is effective to dissolve silicon dioxide but will not materially attack silicon or the photoresist material, the effect of this treatment will be to open windows 105—105 in the oxide layer 103 that will extend through to the epitaxial silicon layer 102. Once these windows have been opened, the photoresist material may be removed and the slice will be in the form as shown in FIG. 4E.

The slices are now returned to the apparatus of this invention for further treatment. After the apparatus is rotating and suitable temperatures are established for the diffusion of conductivity type determining impurities, a gas, bearing a p-type impurity such as boron, is introduced into the treatment chamber. By these means, the boron passes through the windows 105—105 that were opened in the oxide layer 103 and diffuses into the epitaxial layer 102. This will form a number of p-type base regions 106—106 of the transistors.

It is again emphasized that the diffusion of gaseous impurities into the slice is quite sensitive to temperature variations. Accordingly, if the impurity is to be uniformly diffused into the slice, it is of great importance that all points of the slice be at the same temperature. Provision for the epicyclic motion as described herein makes this possible.

Figure 4G:
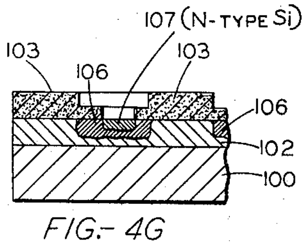

To complete the structure of the n-p-n transistor, an n-type impurity, such as phosphorus, must be diffused into a portion of each base 106 in order to form an n-type emitter region 107. Quite briefly, this is accomplished by repeating the steps discussed with respect to FIGS. 4C through 4E above; that is, the surface of the base 106 is covered with an oxide layer; the oxide layer is coated with a photoresist material which is then selectively masked, exposed and selectively dissolved; the wafer is acid etched to open windows through the oxide layer 103 down to the base 106; and finally, the n-type impurity is diffused in a gaseous state into the base 106 to form the emitter 107. When this has been completed, the slice is as illustrated in FIG. 4G.

Figure 4H:
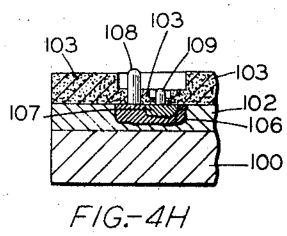

In the final treatment step, the surface of the emitter 107 is provided with an oxide layer (an oxide layer will usually form when phosphorus is being diffused), windows are opened through the oxide layer over portions of the base 106 and emitter 107, and a terminal 108 for the base 106 and a terminal 109 for the emitter 107 are provided by vapor deposition of a conductive metal. Lastly, the slice is subdivided to provide a number of individual transistor wafers as illustrated in FIG. 4H.

From the foregoing, it is believed that it will be apparent to one skilled in the art that the methods and apparatus of this invention are useful in the production of semiconductive devices wherein high temperature gaseous treatments are utilized to obtain epitaxial growth, deposit coatings, or cause the gaseous diffusion of various materials into semiconductive materials.

Example I

A number of slices approximately one inch in diameter and four mils thick were prepared by slicing a single crystal of silicon that was heavily doped with an n-type impurity. After these slices were carefully cleaned and polished, they were placed on the carbon work holders 46—46 of the apparatus of this invention. Following the previously outlined operational procedures, the motor 23 was energized and the susceptor plate 45 was rotated at a speed of about 20 r.p.m. The treatment chamber was then purged with dry helium and the radio frequency coil was energized with an input of about 10 kilowatts. After a few moments operation, the temperature of the susceptor plate 45 reached a steady temperature of about 1200° C. At this time, a gaseous environment of silicon tetrachloride and hydrogen was established within the treatment chamber by continuously introducing these gases via conduit 20 and removing them from the chamber via conduit 36. The treatment continued for several hours until an epitaxial layer of silicon was grown over the surface of the slices to a depth of about ten microns.

After the slices had been cooled, they were removed from the treatment chamber and examined with an infrared spectrophotometer to determine the degree of uniformity of thickness of the epitaxial layer. By these means, it was found that the difference between the thickest and thinnest portions of the epitaxial layer grown over the surface of a given slice was less than 0.2 micron.

Example II

A second set of slices was treated by the identical procedures used in Example I except that the stationary gear 50 was removed from the apparatus. Accordingly, during the gaseous treatment of the slices, the susceptor plate rotated but the slices were not caused to revolve about their own axes. The difference in the thickest and thinnest portions of the epitaxial layer on a given slice was then determined as in Example I and this difference was found to be approximately one micron.

Example III

A third set of slices was then treated in an identical manner to those of Example I except that the motor 23 was not energized, and accordingly, neither the susceptor plate 45 nor the slices were caused to rotate. In this case, the maximum variation in thickness of the epitaxial layer was found to be about two microns.

Example IV

The procedures of Examples I through III were repeated, but rather than growing an epitaxial layer of silicon over the surface of the slices, a gas comprised of hydrogen, silicon tetrachloride and carbon dioxide was introduced into the treatment chamber to form a silicon dioxide layer over the slices. It was found that the thickness of the silicon dioxide layers varied in approximately the same manner as did the epitaxial layers in Examples I through III above.

Example V

In further tests that were conducted on the apparatus of this invention, it was found that the temperature of the susceptor plate 45, when being rotated at about 20 r.p.m. and under the influence of a radio frequency coil receiving about 10 kilowatt input, varied from a temperature of about 1200° C. at its center to about 1210° C. at its periphery. Accordingly, when the stationary gear 50 was removed and the slices did not rotate with respect to the susceptor plate 45, the temperature across the slices differed to the same extent; i.e., $\pm 10°$ C. However, when the stationary gear 50 was properly positioned in the apparatus so that the slices were caused to rotate, it was found that under otherwise identical conditions, the temperature variance across the slices was less than $\pm 1°$ C.

Although certain embodiments of this invention have been shown in the drawings and described in the specification, it is to be understood that the invention is not limited thereto, is capable of modification, and can be rearranged without departing from the spirit and scope of the invention.

What is claimed is:

1. A method for treating semiconductive materials with gases at elevated temperatures, comprising the steps of:

placing a body of semiconductive material in a gas treatment chamber in heat transfer relationship with respect to a susceptor plate;

heating said plate;

rotating said plate;

rotating said body relative to said plate; and
contacting said body with treatment gases introduced into said treatment chamber.

2. A method according to claim 1, in which said plate is rotated about its central vertical axis and said body is rotated about a vertical axis eccentric to said central axis.

3. A method according to claim 1, in which said plate is heated by radio frequency energy to above about 1000° C.

4. A method according to claim 1, in which the treatment gases are selected to effect the epitaxial growth of a semiconductive material over the surface of said body.

5. A method according to claim 1, in which the treatment gases are selected to effect the diffusion of a conductivity type determining impurity into said body.

6. A method according to claim 1, in which said treatment gases are selected to effect the formation of an oxide layer over the surface of said body.

7. In the art of manufacturing semiconductor devices, wherein a masked surface is prepared for the selective diffusion of a conductivity type determining impurity, wherein an epitaxial layer is grown on the surface of a body of semiconductive material, the epitaxial surface is oxidized, selectively masked, and etched to open windows in the oxidized surface, the improvement comprising the method of growing the epitaxial surface by:
placing said body in a gas treatment chamber in heat transfer relationship with respect to a susceptor plate;
heating said susceptor plate to a temperature of from about 1000° C. to about 1250° C. by emission of radio frequency energy from a proximately positioned radio frequency coil;
rotating said susceptor plate relative to said coil;
rotating said body with respect to said susceptor plate; and
contacting said body with gaseous materials that will be effective to cause the epitaxial growth of semiconductive material over the surface of said body.

8. Apparatus for treating semiconductive materials with gases at elevated temperatures, which comprises:
a gas treatment chamber;
a generally horizontally disposed susceptor plate mounted for rotation within said chamber;
a work holder mounted eccentrically on said susceptor plate for rotation with respect thereto, said work holder being designed to support a body of semiconductive material in heat transfer relationship with respect to said susceptor plate;
means for heating said susceptor plate to heat the body;
means for rotating said susceptor plate to cause the body to revolve about the axis of said susceptor plate;
means for rotating said work holder to cause the body to rotate about its own axis while revolving about the axis of said susceptor plate; and
means for introducing treatment gases into said chamber to treat the body.

9. Apparatus according to claim 8, in which said susceptor plate is comprised of molybdenum.

10. Apparatus according to claim 8, in which said work holder is comprised of a carbonaceous material having at least its outer surface covered with a layer of silicon carbide.

11. Apparatus according to claim 8, in which said heating means comprises a radio frequency heating coil positioned in induction heating relationship with respect to said susceptor plate.

12. Apparatus according to claim 8, in which said means for rotating said susceptor plate include a tubular shaft mounted for rotation within said gas treatment chamber, extending vertically from the bottom of said chamber to a point spaced from the top of said chamber; means for securing said plate to an upper portion of said tubular shaft; and drive means for rotating said tubular shaft about a vertical axis.

13. Apparatus according to claim 12, in which said means for introducing gases into said chamber includes a fixedly positioned gas conduit extending axially through said tubular shaft.

14. Apparatus according to claim 13, in which said means for rotating said work holder includes a gear fixedly positioned upon said gas conduit at an elevation adjacent said susceptor plate, and gear teeth spaced on the periphery of said work holder adapted to engage said gear.

15. Apparatus according to claim 14, in which said gear is comprised of carbonaceous material having at least its outer surface covered with a layer of silicon carbide.

16. Apparatus for the gaseous treatment of semiconductive bodies at elevated temperatures, which comprises:
a gas treatment chamber;
a tubular shaft mounted for rotation within said chamber and extending vertically from the bottom of said chamber to a point spaced from the top of said chamber;
drive means for rotating said tubular shaft about a vertical axis;
a generally horizontally disposed susceptor plate mounted on an upper portion of said tubular shaft for rotation therewith, said plate being comprised of a material that is susceptible to heating by radio frequency energy;
a radio frequency coil positioned in induction heating relationship with respect to said susceptor plate;
a fixedly positioned gas conduit extending axially through said tubular shaft;
gear means positioned on said gas conduit adjacent the upper terminus of said tubular shaft; and
at least one generally circular work holder adapted to be received in heat transfer relationship with and supported for rotation upon an upper surface of said susceptor plate, said work holder including an upper surface adapted to support a body of semiconductive material and having gear teeth on the outer periphery thereof that are adapted to engage the teeth of said stationary gear so as to cause rotation of the body about its own axis as the tubular shaft rotates.

17. Apparatus according to claim 16, in which the principal axis of said radio frequency coil intersects the plane of said susceptor plate at substantially a right angle.

References Cited

UNITED STATES PATENTS

| | | | |
|---|---|---|---|
| 3,128,205 | 4/1964 | Illsley | 118—49 |
| 3,233,578 | 2/1966 | Capita | 117—106 X |
| 3,301,213 | 1/1967 | Grochowski et al. | 117—106 X |

HYLAND BIZOT, *Primary Examiner.*

R. A. LESTER, *Assistant Examiner.*

U.S. Cl. X.R.

117—106; 118—48, 49, 49.1, 49.5; 148—174